United States Patent
Park

(10) Patent No.: US 8,955,064 B2
(45) Date of Patent: Feb. 10, 2015

(54) CONTROL OVER ACCESS TO DEVICE MANAGEMENT TREE OF DEVICE MANAGEMENT CLIENT

(75) Inventor: Jung Hun Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 267 days.

(21) Appl. No.: 12/909,444

(22) Filed: Oct. 21, 2010

(65) Prior Publication Data

US 2011/0093935 A1     Apr. 21, 2011

(30) Foreign Application Priority Data

Oct. 21, 2009     (KR) .................. 10-2009-0100143

(51) Int. Cl.
    *G06F 7/04*     (2006.01)
(52) U.S. Cl.
    USPC ............................................... 726/5

(58) Field of Classification Search
    USPC .................................................... 726/5
    See application file for complete search history.

(56) References Cited

U.S. PATENT DOCUMENTS

| | | | |
|---|---|---|---|
| 2005/0100168 A1* | 5/2005 | Ayatsuka | 380/278 |
| 2008/0052514 A1* | 2/2008 | Nakae | 713/168 |
| 2008/0271023 A1* | 10/2008 | Bone et al. | 718/100 |

* cited by examiner

*Primary Examiner* — Anthony Brown
(74) *Attorney, Agent, or Firm* — The Farrell Law Firm, P.C.

(57) ABSTRACT

Provided is a control over access to a Device Management (DM) tree of a client. The client receives a secure area creation password from a server, creates a secure area by using the received creation password, and moves the DM tree to the secure area. In addition, the client receives a secure area access password from the server, accesses the secure area by using the received access password, and performs a remote management through a DM command received from the server. The authority to access the DM tree is given to only the client acquiring a password from the server, which effectively prevents an unauthorized change of a DM tree.

10 Claims, 9 Drawing Sheets

US 8,955,064 B2

CONTROL OVER ACCESS TO DEVICE MANAGEMENT TREE OF DEVICE MANAGEMENT CLIENT

PRIORITY

This application claims priority under 35 U.S.C. §119(a) to an application filed in the Korean Patent Office on Oct. 21, 2009 and assigned Serial No. 10-2009-0100143, the contents of which are incorporated herein by reference.

BACKGROUND OF THE INVENTION

1. Field of the Invention

The present invention relates generally to a control over access to a Device Management (DM) tree of a DM client and, more particularly, to an access control technique allowing a DM client to create a secure area therein, store a DM tree in the secure area, acquire a password from a server and access the DM tree by using the password.

2. Description of the Related Art

As mobile devices and related application services proliferate and mobile device functions increase in complexity, the current mobile communication environment has incurred some difficulty in developing mobile devices and application services to meet network operators' policy, end-users' demand and variations in a network environment. DM technology allows the network operator to effectively set up or control the end-users' device over the air.

A representative DM technology is Open Mobile Alliance (OMA) DM, which allows a management of firmware, software and parameters of a mobile device by means of a DM protocol. In such DM technologies, a main agent managing mobile devices is normally referred to as a DM server, and a target of being managed such as a mobile device is referred to as a DM client.

According to the OMA DM standard, a DM tree which refers to items for managing a client is stored in a client, and a server performs a client management through such a DM tree. However, a conventional OMA DM merely specifies a normal authentication process between a server and a client without specifying the protection of a DM tree.

In particular, such a DM tree is prone to unfavorable changes by a client's unauthorized code manipulations or mistakes. Unfortunately, this may often cause a serious problem in DM functions for a remote client management.

BRIEF SUMMARY OF THE INVENTION

Accordingly, the present invention is to address the above-mentioned problems and/or disadvantages and to offer at least the advantages described below.

Aspects of the present invention are to provide a method, device and system allowing a client to store a DM tree in a secure area created therein and also to access the DM tree by using a password acquired from a server.

According to one aspect of the present invention, provided is a method for controlling an access to a DM tree in a client, including receiving a secure area creation password from a server when there is a need to create a secure area, creating the secure area by using the received secure area creation password, and moving the DM tree to the created secure area.

According to another aspect of the present invention, provided is a method for controlling an access to a DM tree in a client, including transmitting a secure area access password request to a server when there is a need to access a secure area storing the DM tree, receiving a secure area access password offered by a server in response to the request, and accessing the secure area by using the received secure area access password.

According to still another aspect of the present invention, provided is a client device including a communication unit configured to receive a secure area creation password and a secure area access password from a server, a memory unit having a secure area in which a DM tree is stored, the secure area being created by using the secure area creation password, a secure area creation control part configured to create the secure area in the memory unit by using the secure area creation password and to move the DM tree to the secure area, and a secure area access control part configured to control an access to the secure area by using the secure area access password.

According to yet another aspect of the present invention, provided is a DM system in which a server manages remote a client, the system including the server configured to transmit a secure area creation password to the client in a secure area creation process, and to transmit a secure area access password to the client in a DM process, and the client configured to receive the secure area creation password from the server, to create a secure area by using the received secure area creation password, to move a DM tree to the secure area, to receive the secure area access password from the server, to access the secure area by using the received secure area access password, and to perform the DM process.

According to aspects of this invention, any client failing to acquire a password from a server cannot access a DM tree. Therefore, unfavorable changes of a DM tree are prevented. Also, a stable remote DM is established without modifying a conventional OMA DM protocol.

Other aspects, advantages, and salient features of the invention will become apparent to those skilled in the art from the following detailed description, which, taken in conjunction with the annexed drawings, discloses embodiments of the invention.

DETAILED DESCRIPTION OF THE INVENTION

Hereinafter, embodiments of the present invention will now be described more fully with reference to the accompanying drawings. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, detailed descriptions of well-known functions and structures incorporated herein may be omitted for the sake of clarity and conciseness.

A remote device management method will be described in detail using OMA DM. However, this description is not to be considered as a limitation of the present invention, as the invention may also be favorably applied to any other systems or standard processes available for a remote client management.

Figure 1:
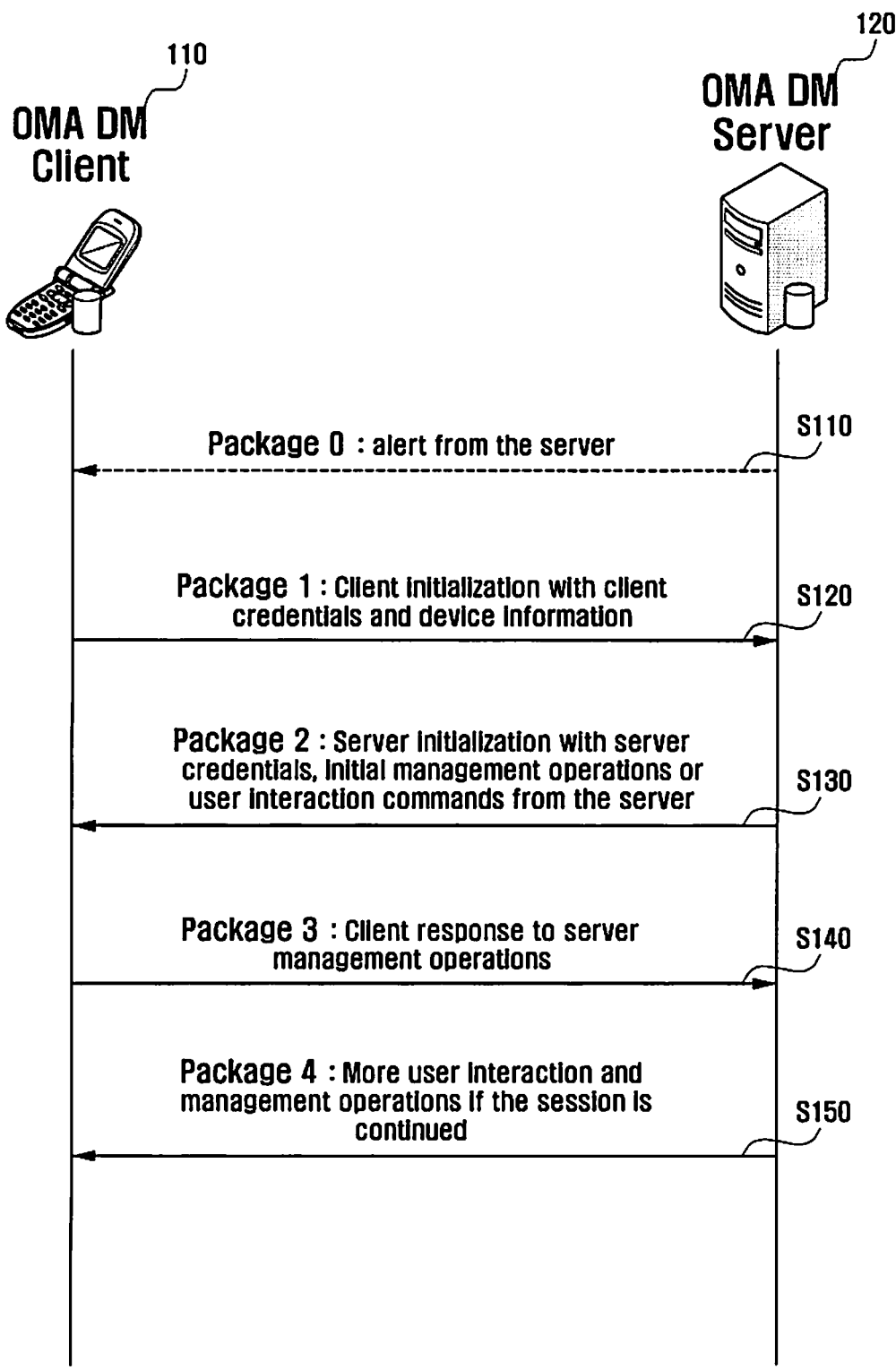
FIG. 1 illustrates a conventional OMA DM protocol defined in the OMA DM standard.

FIG. 1 illustrates an OMA DM protocol defined in the OMA DM standard.

As shown in FIG. 1, an OMA DM protocol consists of five messages from package 0 to package 4. Through this DM protocol, a DM session is established between a server 120 and a client 110.

If there is any management action for the client 110, the server 120 transmits a package 0 message to the client 110 in order to notify the existence of a DM action to the client 110 (step S110). Here, a DM action refers to a certain process that must be executed to manage the client 110.

The client 110 receiving the package 0 message requests a session establishment by sending a package 1 message to the server 120 (step S120). Then the server 120 transmits a package 2 message to the client 110 in order to give a management command (step S130). Thereafter, the client 110 and the server 120 perform a remote management process for the client by sending and receiving a package 3 message and a package 4 message (steps S140 and S150).

Figure 2:
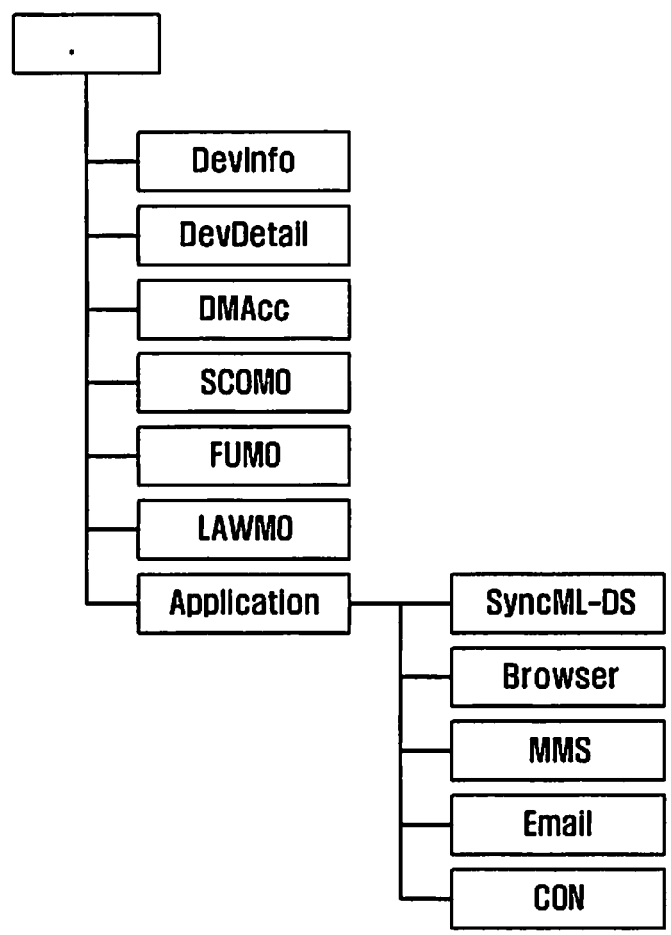
FIG. 2 illustrates the entire structure of a conventional OMA DM tree.

FIG. 2 illustrates the entire structure of a conventional OMA DM tree.

As well known in the art, the OMA DM standard defines a file system of a DM tree through which a client may be remotely controlled. Since the OMA DM tree shown in FIG. 2 is the same as specified in the OMA DM standard document, a detailed description regarding the OMA DM tree will be omitted herein for the sake of conciseness.

Figure 3:
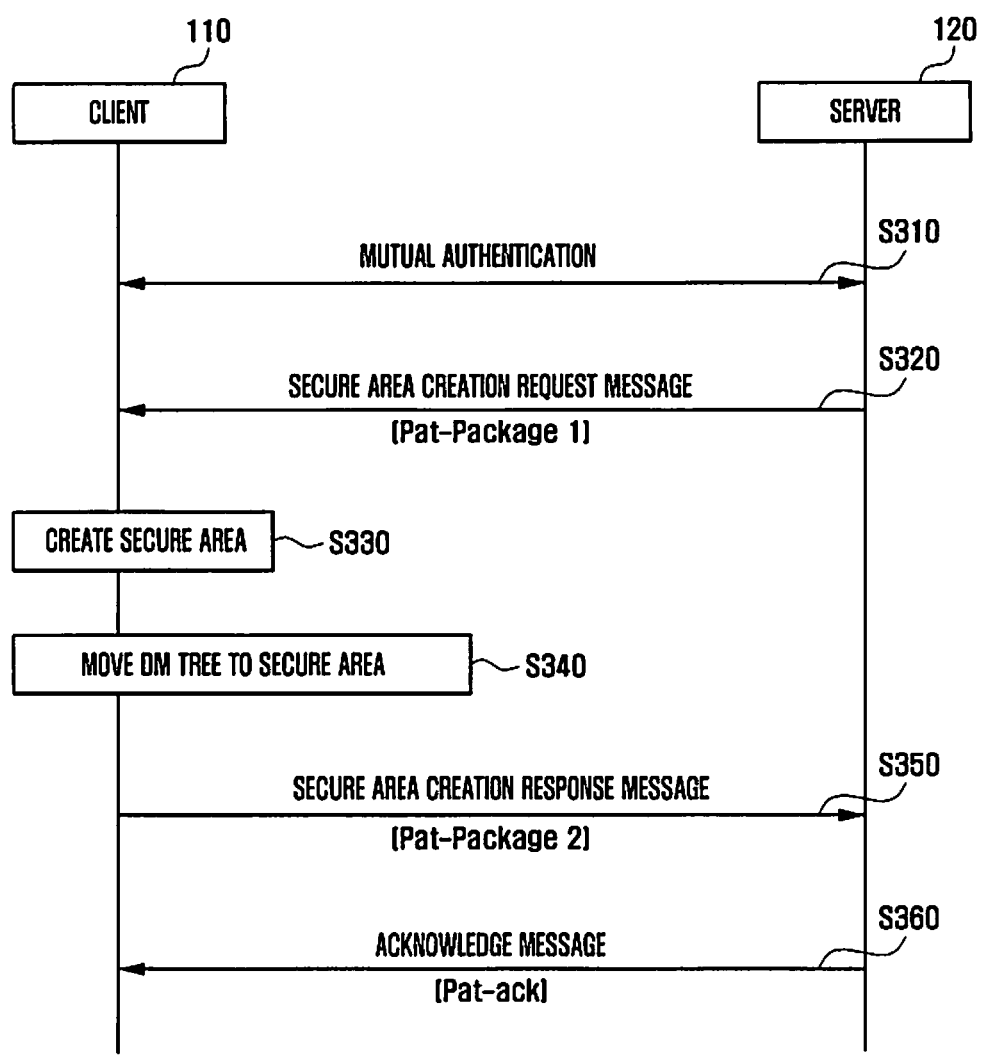
FIG. 3 illustrates a process in which a client creates a secure area and then stores a DM tree in the secure area in accordance with an embodiment of the present invention.

FIG. 3 illustrates a process in which a client creates a secure area and then stores a DM tree in the secure area in accordance with an embodiment of the present invention.

Referring to FIG. 3, both the client 110 and the server 120 perform a mutual authentication process (step S310). Here, a mutual authentication process refers to a series of operations performed to confirm whether the client 110 is allowed to receive a management from the server 120 and whether the server 120 has the authority to manage the client 110. According to the present invention, a mutual authentication process may employ digital certificates issued by a Certification Authority (CA). A conventional authentication process performed between the client 110 and the server 120 has merely employed identification and password. However, a mutual authentication process of the present invention uses digital certificates in order to strengthen security and to strictly judge mutual management rights.

After performing a mutual authentication process, the server 120 transmits a secure area creation request message (Pat-Package 1) to the client 110 (step S320). The server 120 inserts a password into a secure area creation request message. This password is a secure area creation password required in order for the client 110 to create a secure area. In an embodiment of the present invention, such a secure area creation password is not stored in the client 110.

The client 110 receives a secure area creation request message from the server 120 and creates a secure area in a specific region of a memory unit by using a secure area creation password contained in a received message (step S330). A secure area refers to an encoded data region that is created by using a secure area creation password. Since a secure area is encoded, the client 110 cannot read, write or access a secure area without using a secure area access password offered by the server 120.

A secure area creation password is used only for the creation of a secure region and is not stored in the client 110. Therefore, the client 110 cannot access a secure area without receiving a secure area access password from the server 120.

After creating a secure area, the client 110 moves a DM tree to a secure area (step S340). Additionally, the client 110 transmits a secure area creation response message (Pat-Package 2) to the server 120 (step S350). The server then 120 transmits an acknowledge message (Pat-ack) to the client 110 (step S360).

After transmitting and receiving the acknowledge message, the server 120 and the client 110 perform a DM command by using a DM tree in a secure area.

As discussed heretofore, the server 120 sets the client 110 to move a DM tree in an encoded secure area so that the client 110 cannot arbitrarily access a DM tree.

Figure 4:
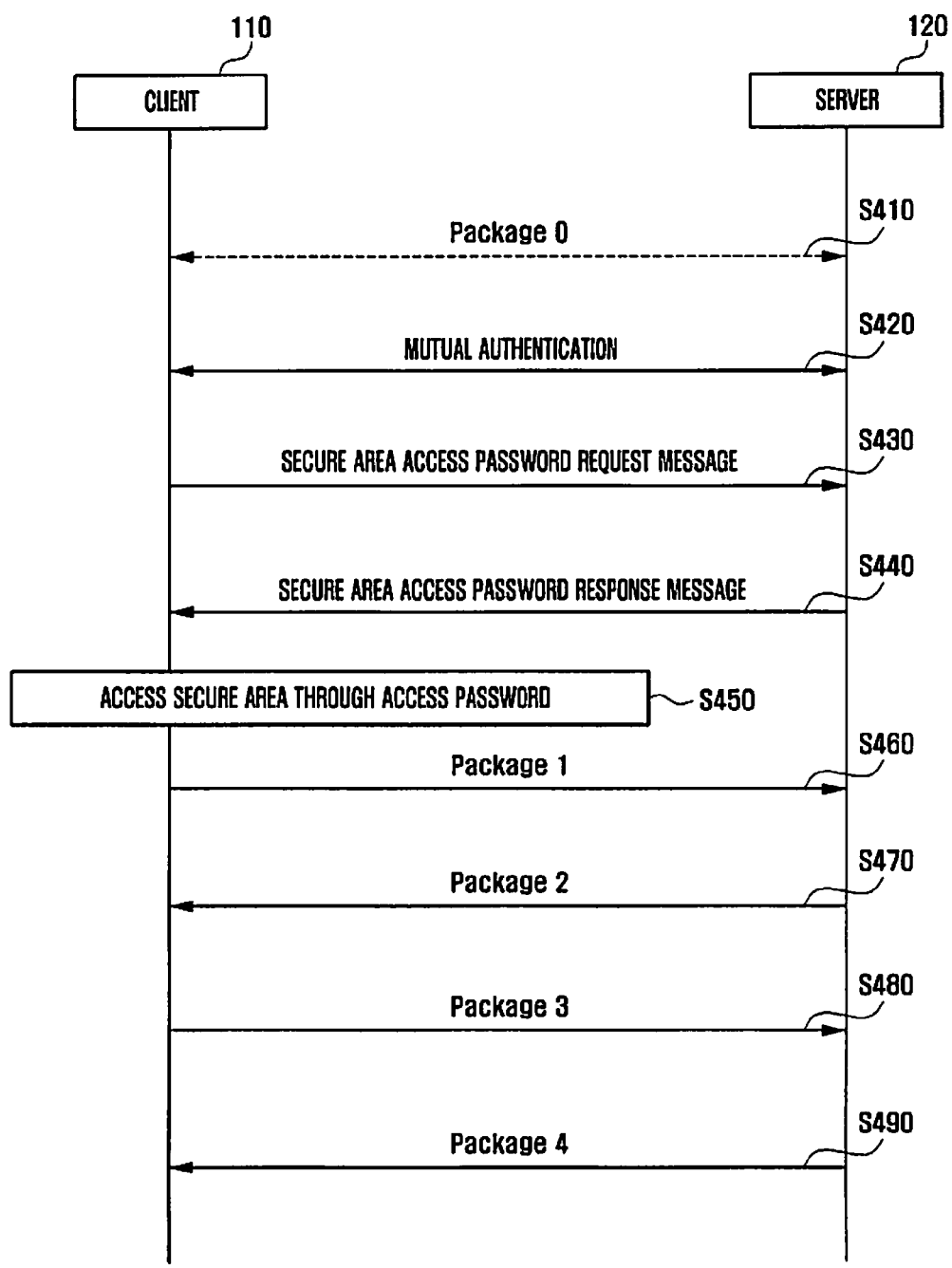
FIG. 4 illustrates a process in which a client having a DM tree in a secure area acquires a password from a server and then accesses the secure area by using the password in accordance with an embodiment of the present invention.

FIG. 4 illustrates a process in which a client having a DM tree in a secure area acquires a password from a server and then accesses the secure area by using the password in accordance with an embodiment of the present invention.

Namely, after a secure area is created in the client 110 as shown in FIG. 3, a given DM process is performed between the server 120 and the client 110 as shown in FIG. 4.

Referring to FIG. 4, the server 120 may transmit a package 0 message to the client 110 (step S410). As mentioned above, a package 0 message is a type of a notification message that is transmitted when the server 120 has a management action for the client 110.

Both the client 110 and the server 120 perform a mutual authentication process (step S410), after which the client 110 transmits a secure area access password request message to the server 120 in order to access a secure area (step S430). In response to a secure area access password request message, the server 120 transmits a secure area access password response message to the client 110 (step S440). A secure area access password may be identical to the aforesaid secure area creation password.

Next, the client 110 accesses a secure area by using a secure area access password acquired from the server 120 (step S450). After accessing a secure area, the client 110 transmits a package 1 message to the server 120 by using information in a DM tree stored in a secure area (step S460). A given DM process is then performed between the server 120 and the client 110 (steps 5470 to S490).

Figure 5:
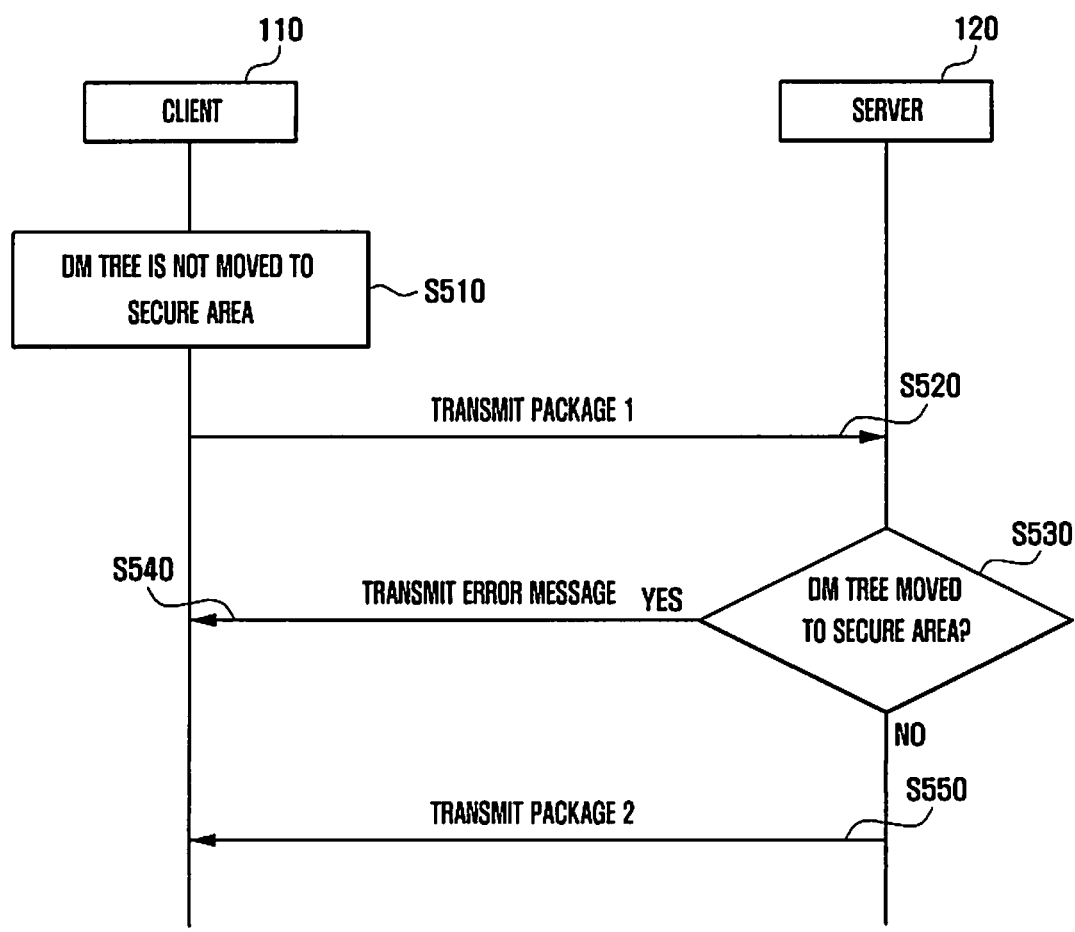
FIG. 5 illustrates a transmission process of a package 1 message when a DM tree is not moved to a secure area in accordance with an embodiment of the present invention.

FIG. 5 illustrates a transmission process of a package 1 message when a DM tree is not moved to a secure area in accordance with an embodiment of the present invention.

Referring to FIG. 5, the client 110 determines that a DM tree is not moved to a secure area (step S510). In this case, the client 110 can access a DM tree even without any password. Therefore, the client 110 transmits a package 1 message to the server 120 by using information stored in a DM tree (step S520).

The server 120 receives a package 1 message and determines whether a DM tree of the client 110 is moved to a secure area (step S530). If a DM tree of the client 110 is moved to a secure area, the server 120 receives a secure area creation response message from the client 110 and then transmits an acknowledge message to the client 110. Therefore, the server 120 determines whether a DM tree is moved to a secure area.

If a DM tree is moved to a secure area of the client 110, the server 120 transmits an error message to the client 110 (step S540). If a DM tree is not actually moved to a secure area, the server 120 transmits a package 2 message to the client 110 (step S550).

Figure 6:
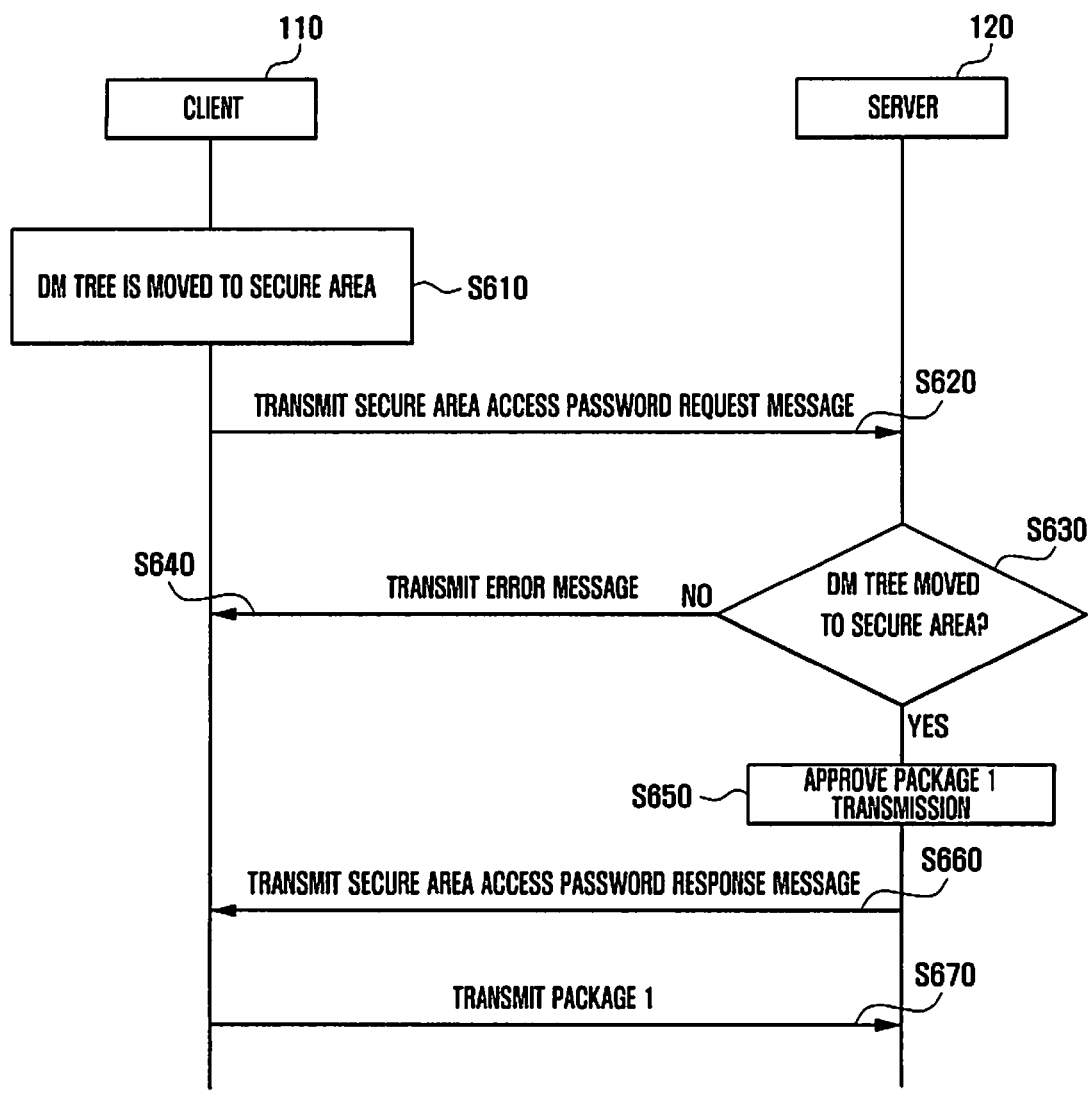
FIG. 6 illustrates a transmission process of a package 1 message when a DM tree is moved to a secure area in accordance with an embodiment of the present invention.

FIG. 6 illustrates a transmission process of a package 1 message when a DM tree is moved to a secure area in accordance with an embodiment of the present invention.

Referring to FIG. 6, the client 110 determines that a DM tree is moved to a secure area (step S610). In this case, the client 110 cannot arbitrarily access a DM tree without a DM password. Therefore, the client 110 transmits a secure area access password request message to the server 120 (step S620).

The server 120 determines whether a DM tree of the client 110 is actually moved to a secure area (step S630). If a DM tree is not moved to a secure area, the server 120 transmits an error message to the client 110 (step S640).

If a DM tree is actually moved to a secure area, the server 120 approves the transmission of a package 1 message from the client 110 (step S650). Therefore, the server 120 transmits a secure area access password response message to the client 110 (step S660). The response message involves a secure area access password.

The client 110 can then access a secure area by using a received password. Therefore, the client 110 transmits a package 1 message to the server 120 by using information in a DM tree (step S670).

Figure 7:
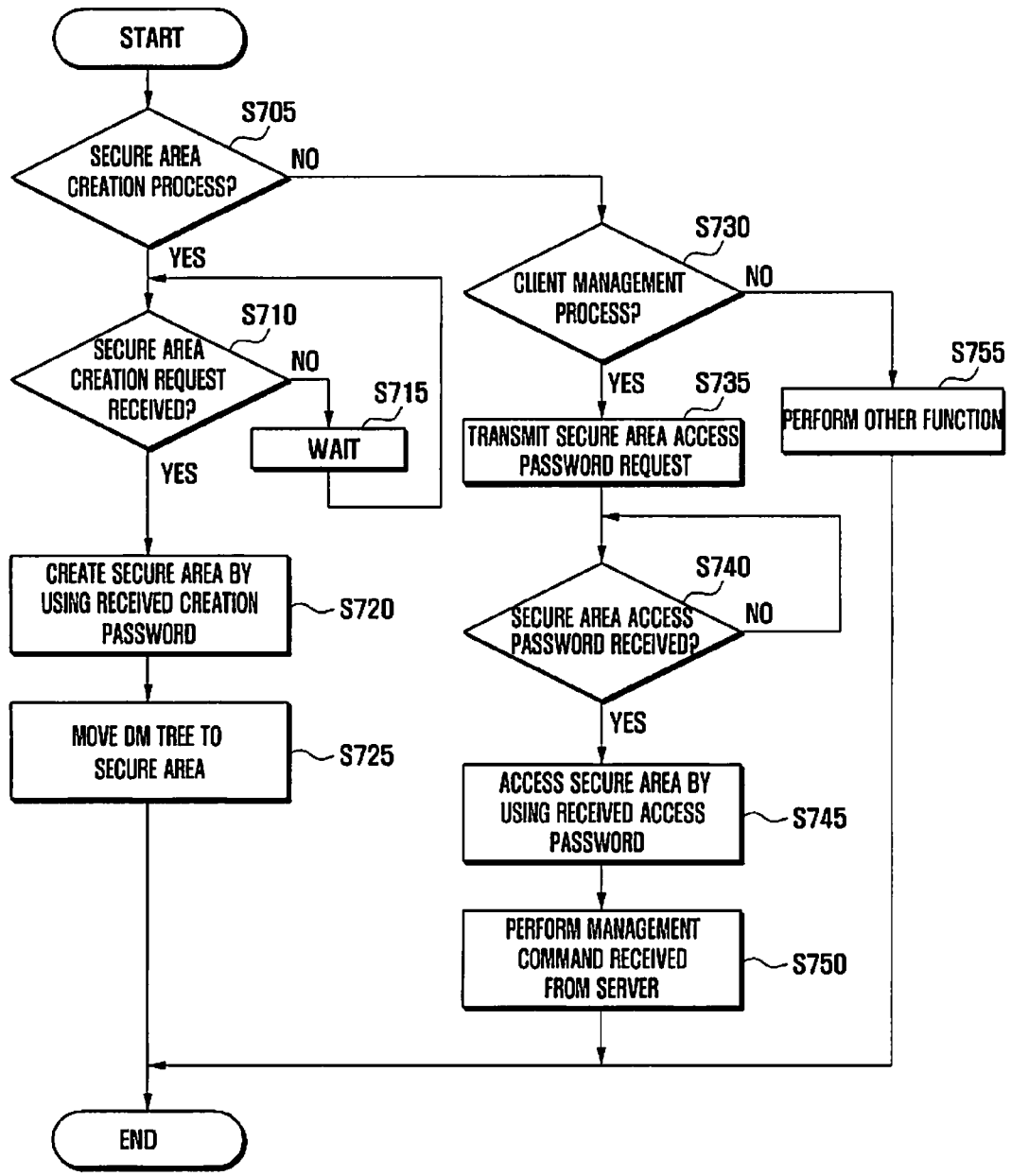
FIG. 7 illustrates an operating process of a client in accordance with an embodiment of the present invention.

FIG. 7 illustrates an operating process of a client in accordance with an embodiment of the present invention.

Referring to FIG. 7, the client 110 determines whether to create a secure area to store a DM tree (step S705).

If there is a need to create a secure area, the client 110 determines whether a secure area creation request message is received from the server 120 (step S710). If a message is not received, the client 110 waits for a secure area creation request message to be received (step S715).

After receiving a secure area creation request message, the client 110 creates a secure area by using a received secure area creation password (step S720). In addition, the client 110 moves a DM tree to a created secure area (step S725).

If it is determined in step S705 that there is no need to create a secure area, namely, if a secure area already exists, the client 110 determines whether to perform a client management (step S730). If there is no need for a client management, the client 110 performs other functions (step S755).

If there is a need to perform a client management, the client 110 transmits a secure area access password request message to the server 120 (step S735), and determines whether a secure area access password response message is received (step S740). If such a message is received, the client 110 accesses a secure area by using a received secure area access password (step S745), receives a management command from the server 120 and performs a received command (step S750).

Figure 8:
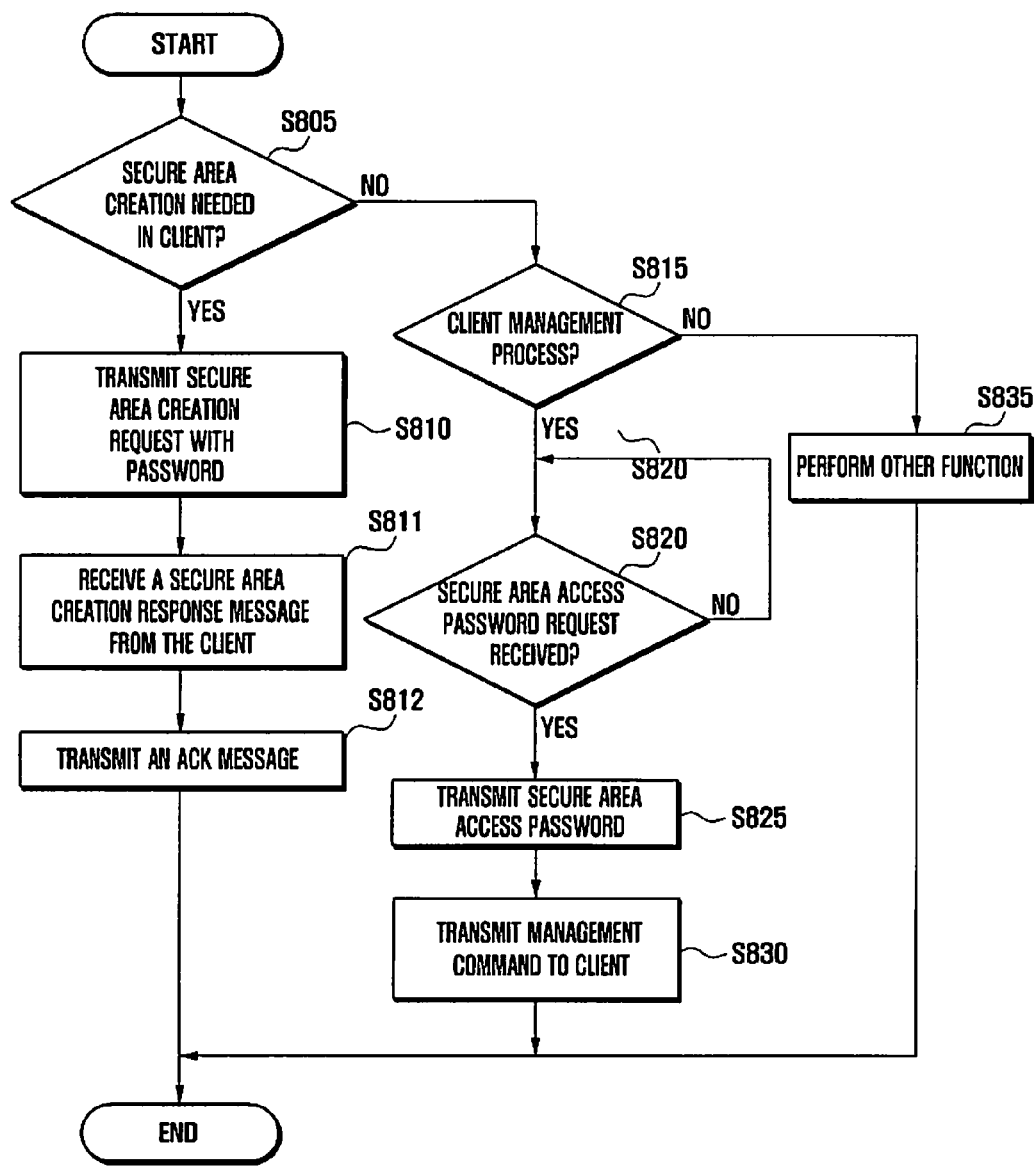
FIG. 8 illustrates an operating process of a server in accordance with an embodiment of the present invention.

FIG. 8 illustrates an operating process of a server in accordance with an embodiment of the present invention.

Referring to FIG. 8, the server 120 determines whether there is a need to create a secure area in the client 110 (step S805). If there is such a need, the server 120 transmits a secure area creation request message to the client 110 (step S810). A secure area creation request message involves a creation password required for the creation of a secure area.

When receiving a secure area creation response message from the client 110 (step S811), the server 120 transmits an acknowledge message to the client 110 (step S812).

However, if it is determined in the above step S805 that there is no need to create a secure area in the client 110 or if a secure area already exists, the server 120 determines whether to perform a client management (step S815). If there is no need for a client management, the server 120 performs other functions (step S835).

If there is a need to perform a client management, the server 120 determines whether a secure area access password request message is received from the client 110 (step S820). If no message is received, the server 120 waits for the reception or performs the aforesaid step S835. If a message is received, the server 120 transmits a secure area access password to the client 110 (step S825). And then, the server 120 sends a management command to the client 110 (step S830).

Figure 9:
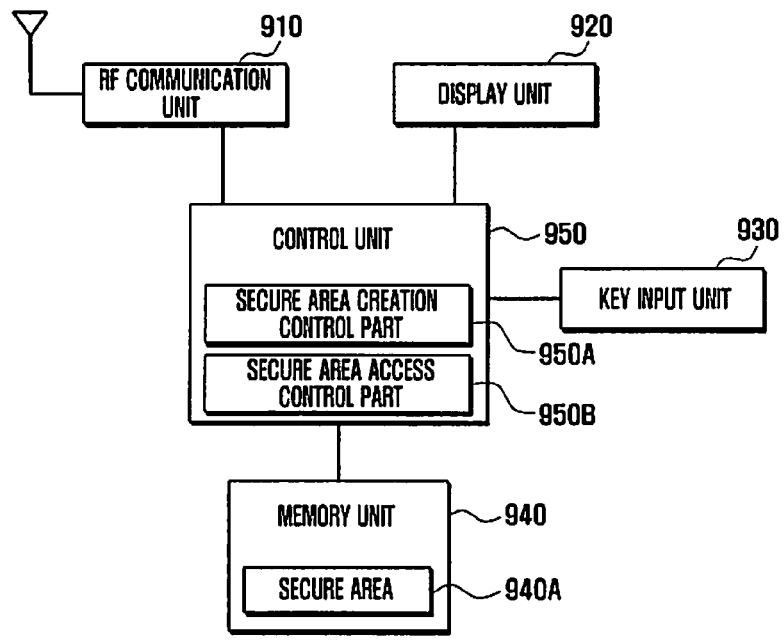
FIG. 9 illustrates the configuration of a client in accordance with an embodiment of the present invention.

FIG. 9 illustrates the configuration of a client in accordance with an embodiment of the present invention.

Referring to FIG. 9, the client 110 includes a Radio Frequency (RF) communication unit 910, a display unit 920, a key input unit 930, a memory unit 940, and a control unit 950. The memory unit 940 has a secure area 940A, and the control unit 950 has a secure area creation control part 950A and a secure area access control part 950B.

The RF communication unit 910 performs the transmission and reception of data for a radio communication of the client 110. Although not shown, the RF communication unit 910 may include an RF transmitter which upwardly converts the frequency of signals to be transmitted and amplifies the signals, and an RF receiver which amplifies received signals with low-noise and downwardly converts the frequency of the received signals.

Also, the RF communication unit 910 may receive data through a radio channel and then deliver it to the control unit 950, and also may transmit output data of the control unit 950 through a radio channel. Particularly, the client 110 may perform a DM process with the server 120 through the RF communication unit 910. In addition, the RF communication unit 910 receives a secure area creation password and a secure area access password from the server 120 and then delivers the same to the control unit 950.

The display unit 920 may be formed of a Liquid Crystal Display (LCD), an Organic Light Emitting Device (OLED), or any other equivalents. The display unit 920 represents on a screen a variety of menus, input data, function information, and the like in association with the operation of the client 110. For example, the display unit 920 outputs such information as a booting page, an idle or main page, various menu pages, some next-depth pages of each menu, and execution pages of various applications.

The key input unit 930 creates various key input signals in association with a user's instructions to control the client 110 and delivers the signals to the control unit 950. Additionally, the key input unit 930 may be formed of a keypad having alphanumeric keys, navigation keys, side function keys and any other special keys. When the client 110 has a touch screen, the key input unit 930 may be virtually realized in a touch screen instead of or in addition to a normal, mechanical input part.

The memory unit 940, which includes a program region and a data region, stores a variety of programs required for the operation of the client 110 and related data. The memory unit 940 may have a secure area 940A in which a DM tree is stored under the control of the control unit 950. The secure area 940A is an encoded data region that is created by using a secure area creation password. The client 110 cannot read, write or access the secure area without a secure area access password offered by the server 120.

The control unit 950 controls general operations of the client 110. Particularly, the control unit 950 may include a secure area creation control part 950A for controlling the creation of the secure area 940A, and a secure area access control part 950B for controlling the access to the secure area 940A.

The secure area creation control part 950A receives a secure area creation password from the server 120 and then creates the secure area 940A by using a received password. Additionally, the secure area creation control part 950A moves a DM tree to the secure area 940A.

The secure area access control part 950B makes a request for a secure area access password to the server 120 and then controls the reception of a secure area access password offered in response to a request. Additionally, the secure area access control part 950B accesses the secure area 940A through a received access password and then may control a series of steps for performing a DM process with the server 120.

Figure 10:
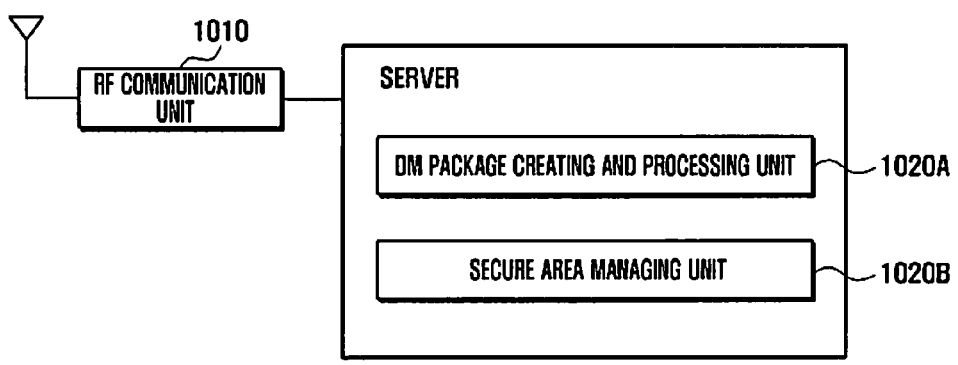
FIG. 10 illustrates the configuration of a server in accordance with an embodiment of the present invention.

FIG. 10 illustrates the configuration of a server in accordance with an embodiment of the present invention.

Referring to FIG. 10, the server 120 includes an RF communication unit 1010, a DM package creating and processing unit 1020A, and a secure area managing unit 1020B.

Similar to the above-described RF communication unit of the client, the RF communication unit 1010 performs the transmission and reception of data for a radio communication of the server 120. Although not shown, the RF communication unit 1010 may include an RF transmitter which upwardly converts the frequency of signals to be transmitted and amplifies the signals, and an RF receiver which amplifies received signals with low-noise and downwardly converts the frequency of the received signals. The server 120 performs a DM process with the client 110 through the RF communication unit 1010.

The DM package creating and processing unit 1020A is a function block that performs the OMA DM protocol defined by the OMA DM. Namely, the DM package creating and processing unit 1020A controls a series of steps for creating and processing five package messages shown in FIG. 1.

The secure area managing unit 1020B controls the transmission of a secure area creation password and a creation request to the client 110 when there is a need to create a secure area in the client 110. Additionally, when receiving a secure area creation response from the client 110, the secure area managing unit 1020B controls the transmission of an acknowledge message to the client 110 in response to a received response.

Also, when receiving a secure area access password request from the client 110 during a client management process, the secure area managing unit 1020B transmits a secure area access password to the client 110 in response to a received request. The client 110 can then access the secure area 940A by using a secure area access password.

As discussed herein, the authority to access a DM tree is given to only the client acquiring a password from the server, which effectively prevents an unauthorized change of a DM tree.

While this invention has been particularly shown and described with reference to embodiments thereof, it will be understood by those skilled in the art that various changes in form and details may be made therein without departing from the spirit and scope of the invention as defined by the appended claims.

What is claimed is:

1. A method for controlling an access to a Device Management (DM) tree in a client, the method comprising:
receiving, from a server, a secure area creation request message comprising a secure area creation password to create a secure area for storing the DM tree;
creating the secure area by using the received secure area creation password; and
moving the DM tree to the created secure area,
wherein the secure area creation password is not stored in the client after the secure area is created.

2. The method of claim 1, further comprising:
transmitting a secure area access password request to the server when there is a need to access the secure area; and
accessing the secure area by using a secure area access password received from the server.

3. The method of claim 2, further comprising:
performing a remote DM process by receiving a DM command from the server after accessing the secure area.

4. The method of claim 1, further comprising:
performing a mutual authentication with the server before receiving the secure area creation password.

5. The method of claim 2, wherein the secure area access password is identical to the secure area creation password.

6. The method of claim 1, further comprising:
transmitting a secure area access password request to a server when there is a need to access a secure area storing the DM tree;
receiving a secure area access password offered by a server in response to the request; and
accessing the secure area by using the received secure area access password.

7. A client device comprising:
a communication unit configured to receive, from a server, a secure area creation request message comprising a secure area creation password to create a secure area for storing the DM tree;
a memory unit having a secure area in which a Device Management (DM) tree is stored, the secure area being created by using the secure area creation password;
a secure area creation control part configured to create the secure area in the memory unit by using the secure area creation password and to move the DM tree to the secure area; and
a secure area access control part configured to control an access to the secure area by using the secure area access password,
wherein the secure area creation password is not stored in the client device after the secure area is created.

8. The client device of claim 7, wherein the secure area creation control part is further configured to perform a mutual authentication with the server before creating the secure area.

9. The client device of claim 7, wherein the secure area creation control part is further configured to control the secure area creation password so as not to be stored after the secure area is created.

10. The client device of claim 7, wherein the secure area access password is identical to the secure area creation password.

* * * * *